(12) United States Patent
Yoon

(10) Patent No.: US 10,406,697 B2
(45) Date of Patent: Sep. 10, 2019

(54) ROBOT ARM MECHANISM

(71) Applicant: LIFE ROBOTICS INC., Tokyo (JP)

(72) Inventor: Woo-Keun Yoon, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 173 days.

(21) Appl. No.: 15/627,111

(22) Filed: Jun. 19, 2017

(65) Prior Publication Data

US 2017/0297209 A1 Oct. 19, 2017

Related U.S. Application Data

(63) Continuation of application No. PCT/JP2015/085235, filed on Dec. 16, 2015.

(30) Foreign Application Priority Data

Dec. 20, 2014 (JP) .................. 2014-258148

(51) Int. Cl.
B25J 18/02 (2006.01)
F16G 13/20 (2006.01)
(52) U.S. Cl.
CPC ............... B25J 18/02 (2013.01); F16G 13/20 (2013.01)
(58) Field of Classification Search
CPC .................................. B25J 18/02; F16G 13/20
(Continued)

(56) References Cited

U.S. PATENT DOCUMENTS 2,574,657 A * 11/1951 Pierce ...................... B66F 3/06
254/1
5,139,464 A 8/1992 Lehnert
(Continued)

FOREIGN PATENT DOCUMENTS

CN 107000221 A 8/2017
JP H11-20770 A 1/1999
(Continued)

OTHER PUBLICATIONS

International Search Report issued in PCT/JP2015/085235, dated Feb. 23, 2016, with English Translation (4 pages).
(Continued)

Primary Examiner — William C Joyce
(74) Attorney, Agent, or Firm — Nakanishi IP Associates, LLC

(57) ABSTRACT

A stable extension and retraction motion is realized in a robot arm mechanism including a linear extension and retraction joint. In the robot arm mechanism including the linear extension and retraction joint, the linear a extension and retraction joint includes an arm section, and an ejection section for supporting the arm section. The arm section includes a first connection piece string and a second connection piece string. The first connection piece string includes a plurality of first connection pieces. The second connection piece string includes a plurality of second connection pieces each having a substantially flat plate shape. The first connection piece string is joined to the second connection piece string to thereby constitute a columnar body. The columnar body is sent out forward from the ejection section. A guide roller for guiding the second connection piece string to the ejection section and keeping an engaged state of a linear gear provided on the second connection piece and a drive gear is provided behind the ejection section.

3 Claims, 7 Drawing Sheets

(58) Field of Classification Search
USPC ................ 901/21, 25, 27; 74/490.01, 490.04
See application file for complete search history.

(56) References Cited

U.S. PATENT DOCUMENTS

| | | | |
|---|---|---|---|
| 5,355,643 A * | 10/1994 | Bringolf | B66F 3/06 24/418 |
| 6,189,639 B1 | 2/2001 | Fuse | |
| 6,419,603 B1 * | 7/2002 | Grasl | B66F 3/06 474/148 |
| 9,248,576 B2 * | 2/2016 | Yoon | B25J 18/025 |
| 2013/0068061 A1 | 3/2013 | Yoon | |
| 2017/0266819 A1 | 9/2017 | Woon | |

FOREIGN PATENT DOCUMENTS

| | | |
|---|---|---|
| JP | 2014-139482 A | 7/2014 |
| WO | 2011/152265 A1 | 12/2011 |

OTHER PUBLICATIONS

Written Opinion of International Searching Authority issued in PCT/JP2015/085235, dated Feb. 23, 2016 (3 pages).
Office Action issued in Chinese Patent Application No. 201580069355.9 dated Jan. 31, 2019, with English Translation (15 pages).

* cited by examiner

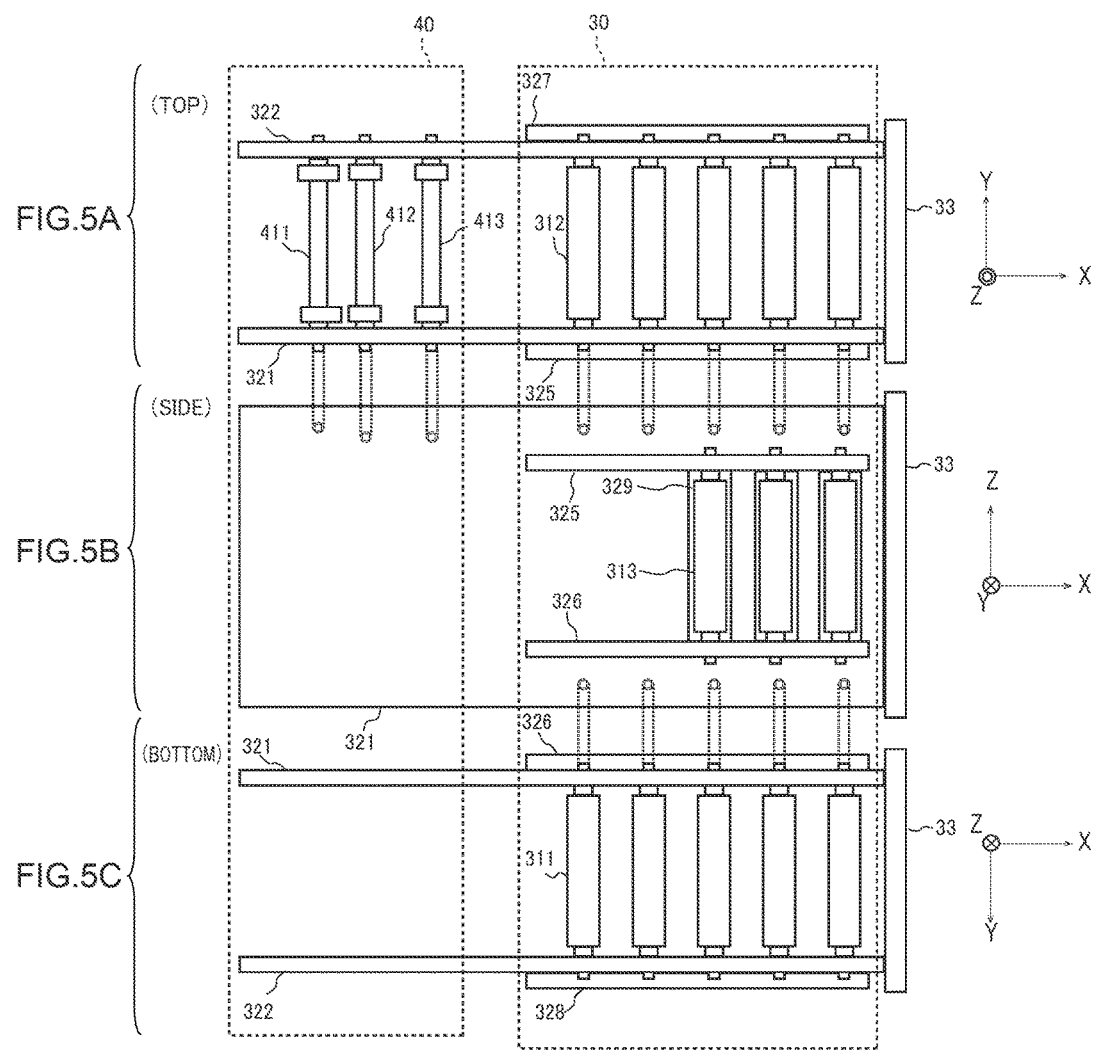

ROBOT ARM MECHANISM

CROSS-REFERENCE TO RELATED APPLICATIONS

This application is continuation application of International Patent Application No. PCT/JP2015/085235 filed on Dec. 16, 2015, which is based upon and claims the benefit of priority from the prior Japanese Patent Application No. 2014-258148, filed Dec. 20, 2014, the entire contents of which are incorporated herein by reference.

FIELD

Embodiments described herein relate generally to a robot arm mechanism.

BACKGROUND

Conventionally, an articulated robot arm mechanism is used in various fields such as an industrial robot. For example, the articulated robot arm mechanism like this is provided with a linear extension and retraction joint in combination with other joints. An arm section constituting the linear extension and retraction joint includes, for example, connection piece strings in each of which a plurality of pieces having the same shapes are connected in a string shape. The connection piece strings are joined, and thereby a columnar body having a certain rigidity is formed. When the linear extension and retraction joint is driven, the arm section extends or retracts. Specifically, when a motor rotates, the connection piece strings which are stored are guided to a joining mechanism, and the arm section as the columnar body formed by the connection piece strings being joined by the joining mechanism is extended. Accordingly, if the connection piece strings are moved out of a designed path, an extension and retraction motion of the robot arm mechanism is unlikely to be stable.

BRIEF DESCRIPTION OF THE INVENTION

A purpose of the present invention is to realize a stable extension and retraction motion in a robot arm mechanism including a linear extension and retraction joint.

A robot arm mechanism according to the present embodiment includes a linear extension and retraction joint, the linear extension and retraction joint includes an arm section and an ejection section for supporting the arm section, the arm section includes a first connection piece string and a second connection piece string, the first connection piece string includes a plurality of first connection pieces each having a U-shaped cross section, an arc cross section or a hollow square cross section, the second connection piece string includes a plurality of second connection pieces each having a substantially flat plate shape, the second connection piece string is joined to the first connection piece string to thereby constitute a columnar body, the second connection piece string is sent out forward from the ejection section together with the first connection piece string in a state where the second connection piece string is joined to the first connection piece string, and a guide roller for guiding the second connection piece string to the ejection section and keeping an engaged state of a linear gear provided on the second connection piece and a drive gear for driving the second connection piece string is provided.

BRIEF DESCRIPTION OF THE VIEWS OF THE DRAWINGS

FIGS. 5A to 5C are diagrams of the guide section in FIG. 3, which are a top diagram, a side diagram, and a bottom diagram;

DETAILED DESCRIPTION

Figure 1:
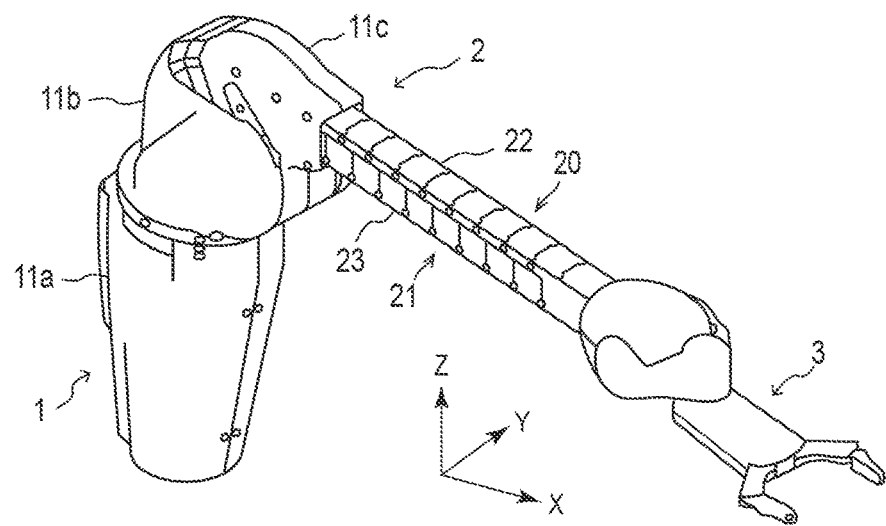
FIG. 1 is an external perspective view of a robot arm mechanism according to an embodiment.

Hereinafter, a robot arm mechanism according to the present embodiment is described with reference to the accompanying drawings. In the following description, the same reference numerals denote components having substantially identical functions and structures, and the repeated description thereof is made only when necessary.

Figure 2:
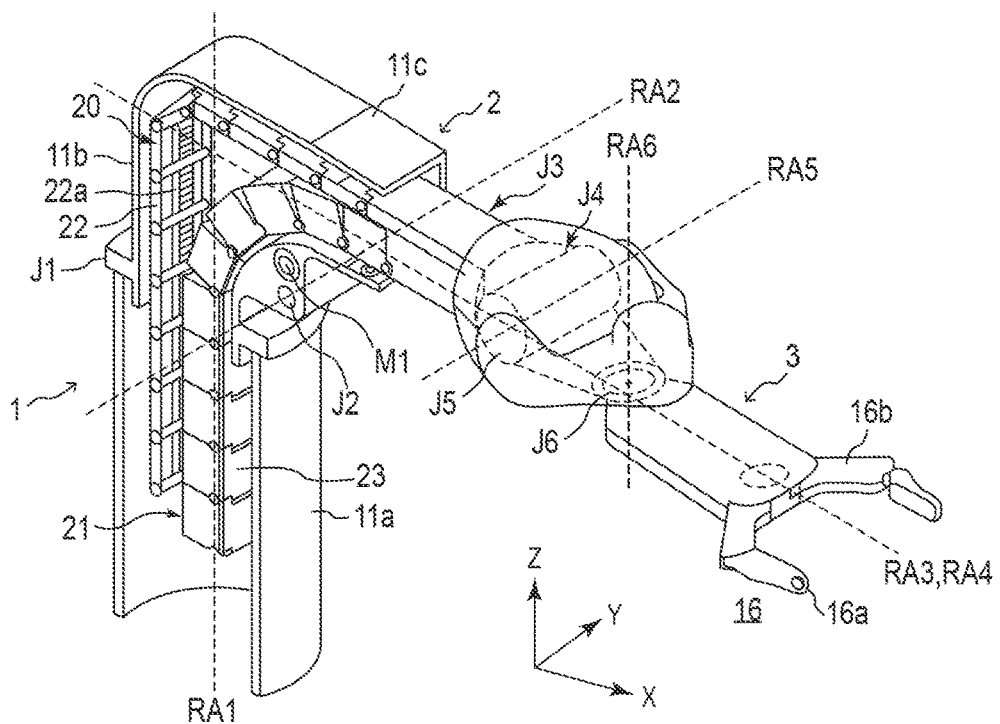
FIG. 2 is a perspective view illustrating an internal structure of the robot arm mechanism in FIG. 1.
Figure 3:
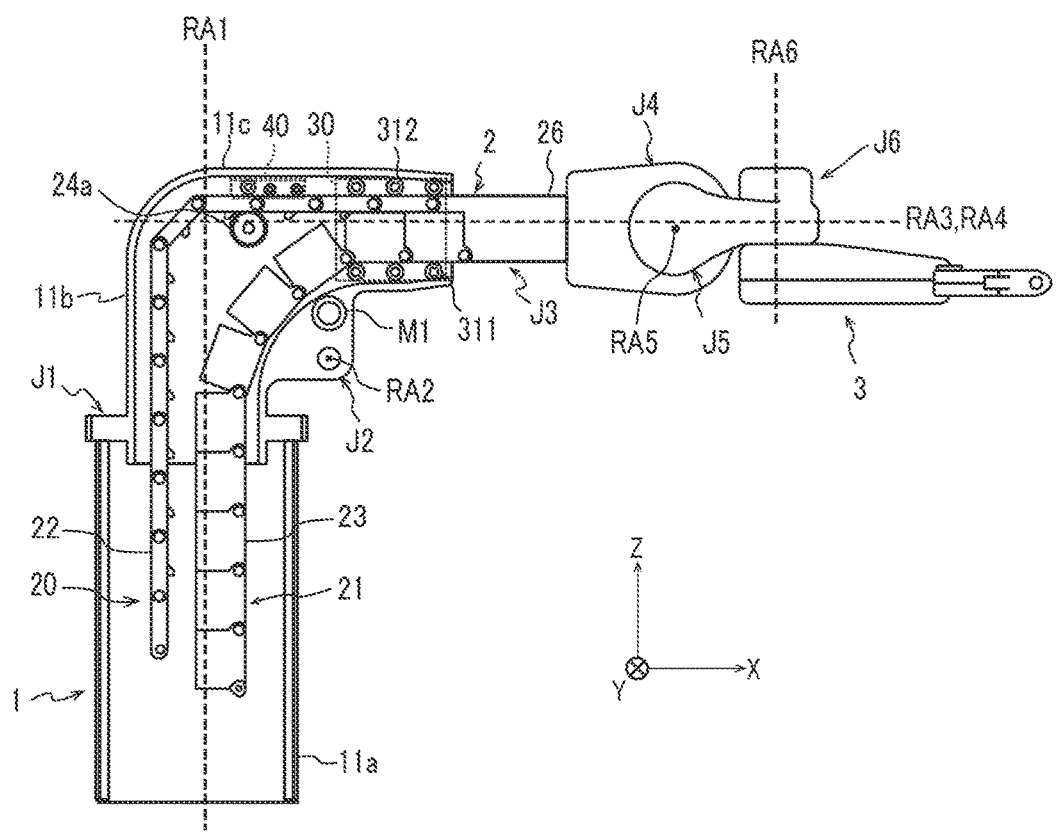
FIG. 3 is a view illustrating the internal structure of the robot arm mechanism in FIG. 1, which is a cross section view.

FIG. 1 is an external perspective view of the robot arm mechanism according to the present embodiment. FIG. 2 and FIG. 3 are views illustrating an internal structure of the robot arm mechanism in FIG. 1. The robot arm mechanism includes a substantially cylindrical base 1 and an arm section 2 connected to the base 1. An end effector 3 is attached to a tip of the arm section 2. In FIG. 1, a hand section capable of holding an object is illustrated as the end effector 3. The end effector 3 is not limited to the hand section, but may be another tool, a camera, or a display. At the tip of the arm section 2, an adapter which can be replaced with any type of the end effector 3 may be provided.

The arm section 2 includes a plurality (herein, six) of joints J1, J2, J3, J4, J5 and J6. The plurality of the joints J1, J2, J3, J4, J5 and J6 are arranged in order from the base 1. Generally, a first axis RA1, a second axis RA2, and a third axis RA3 are called root three axes, and a fourth axis RA4, a fifth axis RA5, and a sixth axis RA6 are called wrist three axes for changing the posture of the hand section 3. At least one of the joints J1, J2 and J3 constituting the root three axes is a linear motion joint. Herein, the third joint J3 is formed as a linear motion joint, in particular, a joint with a relatively long extension distance. The first joint J1 is a torsion joint that rotates on the first axis of rotation RA1 which is held, for example, perpendicularly to a base surface. The second joint J2 is a bending joint that rotates on the second axis of rotation RA2 perpendicular to the first axis of rotation RA1. The third joint J3 linearly extends or retracts along the third axis (axis of movement) RA3 perpendicular to the second axis of rotation RA2. The fourth joint J4 is a torsion joint that rotates on the fourth axis of rotation RA4 which matches the third axis of movement RA3. The fifth joint J5 is a bending joint that rotates on the fifth axis of rotation RA5 orthogonal to the fourth axis of rotation RA4. The sixth joint J6 is a bending joint, that rotates on the sixth axis of rotation RA6 orthogonal to the fourth axis of rotation RA4 and perpendicular to the fifth axis of rotation RA5.

The arm section 2 turns together with the hand section 3 in accordance with torsional rotation of the first joint J1. The arm section 2 rotates upward and downward on the second axis of rotation RA2 of the second joint J2 together with the hand section 3 in accordance with bending rotation of the second joint J2. An arm support body (a first support body) 11a forming the base 1 has a cylindrical hollow structure formed around the axis of rotation RA1 of the first joint J1. The first joint J1 is mounted on a fixed base (not shown). When the first joint J1 rotates, the first support body 11a axially rotates in accordance with the turn of the arm section 2. The first support body 11a may be fixed on a ground plane. In this case, the arm section 2 turns independently of the first support body 11a. A second support body 11b is connected to an upper part of the first support body 11a.

The second support body 11b has a hollow structure continuous to the first support body 11a. One end of the second support body 11b is attached to a rotating section of the first joint J1. The other end of the second support body 11b is opened, and a third support body 11c is set rotatably on the axis of rotation RA2 of the second joint J2. The third support body 11c has a scaly hollow structure communicating with the first support body 11a and the second support body 11b. In accordance with the bending rotation of the second joint J2, a rear part of the third support body 11c is accommodated in or sent out from the second support body 11b. The rear part of the third joint J3, which constitutes the linear motion joint of the arm section 2, is housed inside the continuous hollow structure of the first support body 11a and the second support body 11b by retraction thereof.

The first joint J1 includes an annular fixed section and a rotating section, and is fixed to a base at the fixed section. The first support body 11a and the second support body 11b are attached to the rotating section. When the first joint J1 rotates, the first support body 11a, the second support body 11b, and the third support body 11c turn around the first axis of rotation RA1 together with the arm section 2 and the hand section 3.

The third support body 11c is set rotatably, at the lower part of its rear end, on the axis of rotation RA2 with respect to a lower side of an open end of the second support body 11b. In this way, the second joint J2 serving as a bending joint that rotates on the axis of rotation RA2 is formed. When the second joint J2 rotates, the arm section 2 rotates vertically, i.e., rotates upward and downward, on the axis of rotation RA2 of the second joint J2 together with the hand section 3. The axis of rotation RA2 of the second joint J2 is perpendicular to the first axis of rotation RA1 of the first joint J1 serving as a torsion joint.

As described above, the third joint J3 serving as a joint constitutes a main constituent of the arm section 2. The hand section 3 described above is provided at the tip of the arm section 2. The hand section 3 is equipped at the tip of the arm section 2 as illustrated in FIG. 1. The hand section 3 is moved to a given position by the first joint J1, the second joint J2, and the third joint J3, and placed in a given posture by the fourth joint J4, the fifth joint J5, and the sixth joint J6. The hand section 3 includes two fingers 16a and 16b configured to be opened and closed. The fourth joint J4 is a torsion joint having the axis of rotation RA4 which typically matches a center axis of the arm section 2 along the extension and retraction direction of the arm section 2, that is, the axis of movement RA3 of the third joint J3. When the fourth joint J4 rotates, the hand section 3 rotates on the axis of rotation RA4 from the fourth joint J4 to the tip thereof.

The fifth joint J5 is a bending joint having the axis of rotation RA5 orthogonal to the axis of movement RA4 of the fourth joint J4. When the fifth joint J5 rotates, the hand section 3 pivots up and down from the fifth joint J5 to its tip together with a hand 16. The sixth joint J6 is a bending joint having the axis of rotation RA6 orthogonal to the axis of rotation RA4 of the fourth joint J4 and perpendicular to the axis of rotation RA5 of the fifth joint J5. When the sixth joint J6 rotates, the hand 16 turns left and right.

Rotation, bending, and extension and retraction of the first to sixth joints J1 to J6 enable positioning a two-fingered hand 16 of the hand section 3 at a given position and posture. In particular, the linear extension and retraction distance of the third joint J3 enables the hand section 3 to act on an object in a wide range from a position close to the base 1 to a position far from the base 1.

The third joint J3 is characterized by the linear extension and retraction distance realized by a linear extension and retraction arm mechanism constituting the third joint J3. The linear extension and retraction distance is achieved by the structure shown in FIG. 2 and FIG. 3. The linear extension and retraction arm mechanism includes a first connection piece string 21 and a second connection piece string 2Q. In an alignment pose where the arm section 2 is horizontal, the first connection piece string 21 is located below the second connection piece string 20, and the second connection piece string 20 is located above the first connection piece string 21.

The first connection piece string 21 includes a plurality of first connection pieces 23 having the same U-shaped cross section and connected to form a string by pins at their front surface parts. The first connection piece string 21 is bendable in its back surface direction but conversely not bendable in its front surface direction due to the shape of the cross section of the first connection piece 23 and connection positions by the pins. The shape of the cross section of the first connection piece 23 may be a hollow square shape, an arc shape, etc. as well as the U shape.

The second connection piece string 20 includes a plurality of second connection pieces 22 having a substantially flat plate shape with a width substantially equivalent to that of the first connection piece 23, and connected to form a string by pins. The second connection piece string 20 has a characteristic that the second connection piece string 20 is bendable in its front surface direction but conversely not bendable in its back surface direction due to the shape of connection portions and connection positions by the pins. The first connection piece string 21 is joined to the second connection piece string 20 at the tip of the first connection piece string 21 by a joining piece 26. The joining piece 26 has an integrated shape of the first connection piece 23 and the second connection piece 22. As shown in FIG. 2, a linear gear 22a is formed on the back surface of each of the second connection pieces 22. The linear gears 22a are connected to form a continuous linear gear (rack) when the second connection piece 22 has a linear shape.

As shown in FIG. 3, a guide section 40 is provided between a drive gear 24a and the ejection section 30. The guide section 40 keeps an engaged state of the linear gear 22a formed on a back surface of the second connection piece 22 and the drive gear 24a. When the arm is extended, the motor M1 drives, and the drive gear 24a rotates forward, whereby the second connection piece string 20 is joined to the first connection piece string 21 to form the columnar body to be sent out forward from the ejection section 30. At this time, back surfaces of the first connection piece string 21 and the second connection piece string 20 are joined to each other, and thereby the columnar body is formed. When the arm is retracted, the motor M1 is driven, and the drive gear 24a rotates backward, so that the joined state of the strings 20 and 21 is released behind the ejection section 30, and the first connection piece string 21 and the second connection piece string 20 are separated from each other. The second connection piece string 20 and first connection piece string 21 separated from each other restore their bendable state, are bent in a direction along the first axis of rotation RA1, and are housed inside the first support body 11a.

Figure 4A:
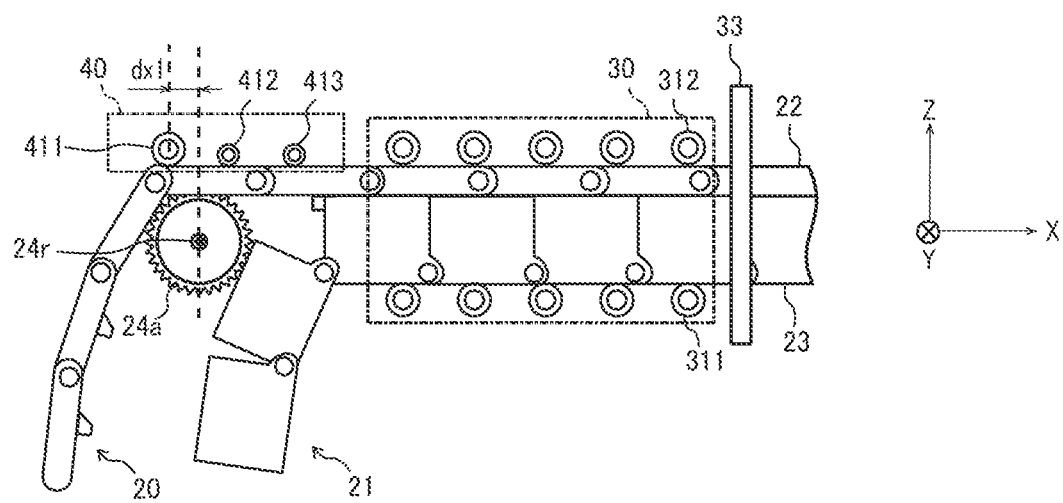
FIGS. 4A and 4B are diagrams illustrating a positional relationship between a guide section and a drive gear in FIG. 3.
Figure 4B:
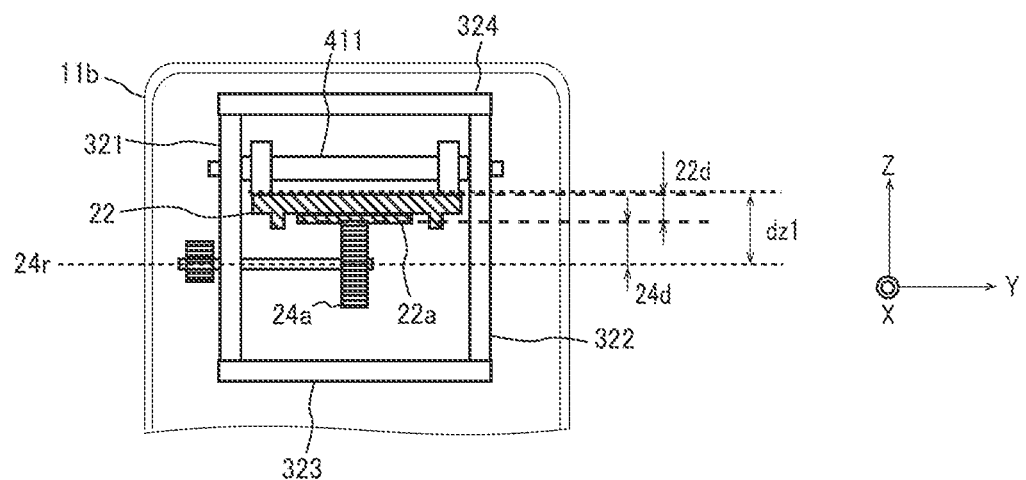

Hereinafter, a structure of the guide section 40 is described with reference to FIGS. 4A and 4B, and FIGS. 5A to 5C. FIGS. 4A and 4B are diagrams illustrating a positional relationship between the guide section 40 and the drive gear 24a in FIG. 3. FIGS. 5A to 5C are a top diagram, a side diagram, and a bottom diagram of the guide section 40 in FIG. 3.

The guide section 40 has a function of guiding the second connection piece string 20 to a joining mechanism. The joining mechanism is for joining the first connection piece string 21 and the second connection piece string 20 and forming the columnar body. In the present embodiment, the joining mechanism is constituted as the ejection section 30. Accordingly, hereinafter, the joining mechanism is referred to as the ejection section 30. The guide section 40 forms a path of movement of the second connection piece string 20, from the drive gear 24a to the ejection section 30. The path of movement is a path for the second connection piece string 20 to enter the ejection section 30 at an appropriated angle. Allowing the second connection piece string 20 to enter the ejection section 30 at an appropriate angle reduces a problem such as not being able to join the first connection piece string 21 to the second connection piece string 20 in the ejection section 30. Further, the guide section 40 has a function of keeping the engaged state of the linear gear 22a provided at the second connection piece 22 and the drive gear 24a. Details of these functions are described later.

The guide section 40 is typically constituted as follows. The guide section 40 has an external appearance in a U shape. The guide section 40 includes a pair of side wall plates 321 and 322, a lower wall plate 323 and an upper wall plate 324. The side wall plate 321 is a rectangular flat plate. A short side of the side wall plate 321 is longer than a thickness of the arm section 2, and a long side has a length approximately equal to a distance from the ejection port 33 to a rear part of the drive gear 24a. The side wall plate 322 and the upper wall plate 324 have the same shape as that of the side wall plate 321. The pair of side wall plates 321 and 322 are fixed to the first support body 11a or the second support, body 11b.

The pair of side wall plates 312 and 322 are disposed by being separated by equal distances in a lateral direction (a +Y direction and a −Y direction in the drawings) respectively from an ejection center axis. The pair of side wall plates 321 and 322 are disposed by being separated by a longer distance than a width of the columnar body. A space between lower end portions of the pair of side wall plates 321 and 322 is fixed by the lower wall plate 323. A space between upper end portions of the pair of side wall plates 321 and 322 is fixed by the upper wall plate 324. A space between the pair of side wall plates 321 and 322 is kept constant by the lower wall plate 323 and the upper wall plate 324. The ejection center axis refers to a center axis of the ejection section 30. When the arm section 2 is supported by the ejection section 30, the ejection center axis coincides with a center axis of the arm section 2.

Guide rollers are rotatably fixed to between the upper end portions of the side wall plates 321 and 322. The guide rollers each include a shaft and rollers. Both ends of the shaft are respectively fixed to the side wall plates 321 and 322. Two rollers are rotatably attached to the shaft. The guide section 40 according to the present embodiment includes a plurality of (herein three) guide rollers 411, 412, and 413. The plurality of guide rollers 411, 412, and 413 have axes of rotation parallel with a width direction of the second connection piece 22. The plurality of guide rollers 411, 412, and 413 are arranged in a region from a vicinity of the drive gear 24a to the ejection section 30.

First, disposition of the last guide roller 411 among the plurality of guide rollers 411, 412, and 413 is described. The last guide roller 411 is disposed at a position for keeping engagement of the drive gear 24a and the linear gear 22a, in the vicinity of the drive gear 24a. Specifically, the guide roller 411 is disposed so that a distance dx1 about the ejection center axis, from an axis or rotation 24r of the drive gear 24a to an axis of rotation of the guide roller 411 becomes equal to or less than a radius of the drive gear 24a. It is preferable that the guide roller 411 is disposed so that the distance dx1 is zero, i.e., at a same position as a position of the drive gear 24a with respect to the ejection center axis. Further, the guide roller 411 is disposed by being separated from the axis of rotation 24r of the drive gear 24a by a longer distance than a predetermined distance dz1, with respect to a radial direction of the drive gear 24a. The predetermined distance dz1 has a distance necessary for the drive gear 24a and the linear gear 22a to engage with each other. That is, the predetermined distance dz1 corresponds to a total length of a radius 24d of the drive gear 24a and a thickness 22d of the second connection piece 22. The thickness 22d corresponds to a length from a front surface of the second connection piece 22 to a lower end of the linear gear 22a provided on the hack surface. Thereby, the second connection piece string 20 is sandwiched between the guide roller 411 and the drive gear 24a after being engaged with the drive gear 24a, and the engaged state of the linear gear 22a and the drive gear 24a is kept. The plurality of guide rollers 412 and 413 are arranged between the last guide roller 411 and the ejection section 30. A method for disposing the plurality of guide rollers 412 and 413 is described later.

The ejection section 30 has a function of joining the first connection piece string 21 and the second connection piece string 20, and a function of supporting the arm section 2. Consequently, the ejection section 30 is constituted as follows. The ejection section 30 has an external appearance in a substantially rectangular cylindrical shape. In the present embodiment, the pair of side wall plates 321 and 322, the lower wall plate 323 and the upper wall plate 324 are common components between the guide section 40 and the ejection section 30. Accordingly, the guide section 40 and the ejection section 30 are constituted on the pair of side wall plates 321 and 322. At this time, the guide section 40 is constituted rearward of the ejection section 30. The guide section 40 and the ejection section 30 may be constituted respectively on different pairs of side wall plates. However, by constituting the guide section 40 and the ejection section 30 on the common pair of side wall plates 321 and 322 as in the present embodiment, effects as follows can be obtained. That is, the common pair of side wall plates 321 and 322 reduce the number of components by one of the pairs of side wall plates. Further, the common pair of side wall plates 321 and 322 can prevent the second connection piece string 20 from deviating in the width direction, in a period until the second connection piece string 20 reaches the ejection section 30. In other words, the common pair of side wall plates 321 and 322 can perform a part of the function of guiding the second connection piece string 20.

The side wall plate 321 is provided with a plurality of side rollers 313, and the side wall plate 322 is provided with a plurality of side rollers 314. Hereinafter, the plurality of side rollers 313 that are provided on the side wall plate 321 are described.

A pair of bearing portions 325 and 326 are fixed to predetermined positions on an outer side surface of the side wall plate 321. The bearing portion 325 is a slim rectangular column, and has a center axis parallel with the ejection center axis. The bearing portion 326 has the same shape as that of the bearing portion 325. The positions to which the pair of bearing portions 325 and 326 are fixed respectively correspond to positions that are separated by equal distances in a vertical direction (a +Z direction and −Z direction in the drawings) from the ejection center axis.

The plurality of side rollers 313 are rotatably fixed to between the bearing portions 325 and 326. The plurality of side rollers 313 are arranged parallel with one another along the ejection center axis. The plurality of side rollers 313 have axes of rotation in the vertical direction (the Z direction in the drawings). The side roller 313 has a longer radius than a distance to an inner side surface of the side wall plate 321 from the axis of rotation of the side roller 313 that is fixed to the bearing portions 325 and 326. In a predetermined position of the side wall plate 321, a projection hole 329 for allowing the side roller 313 to project from the inner side surface of the side wall plate 321 is formed. A position where the projection hole 329 is formed in the side wall plate 321 corresponds to a position of the side roller 313 that is fixed to between the bearing portions 325 and 326. Since the projection hole 329 is formed in the side wall plate 321, the side roller 313 fixed to the bearing portions 325 and 326 projects from the inner side surface of the side wall plate 321. A support surface that supports the columnar body is defined by projection ends of the plurality of side rollers 313 that are projected from the inner side surface of the side wall plate 321.

In the same way as the side wall plate 321, a pair of bearing portions 327 and 328 are fixed to the side wall plate 322. In the same way as the pair of bearing portions 325 and 326, a plurality of side rollers 314 are rotatably fixed to between the pair of bearing portions 327 and 328. The side roller 314 has the same shape as the side roller 313. The plurality of side rollers 314 project from an inner side surface of the side wall plate 322 in the same way as the plurality of side rollers 313. A support surface that supports the columnar body is defined by projection ends of the plurality of side rollers 314 that are projected from the inner side surface of the side wall plate 322.

A distance from the support surface defined by the plurality of side rollers 313 to the support surface defined by the plurality of side rollers 314 corresponds to a width of a cylindrical part of the ejection section 30. The support surface defined by the plurality of side rollers 313 and the support surface defined by the plurality of side rollers 314 are designed so that the width of the cylindrical part of the ejection section 30 is equal to or less than a width of the columnar body. Specifically, projection lengths of the side rollers 313 and 314 from the inner side surfaces of the side wall plates 321 and 322 are adjusted so that the distance from the support surface defined by the plurality of side rollers 313 to the support surface defined by the plurality of side rollers 314 becomes equal to or less than the width of the columnar body. When the distance from the support surface defined by the plurality of side rollers 313 to the support surface defined by the plurality of side rollers 314 is shorter than the width of the columnar body, the plurality of side rollers 313 and 314 support the columnar body in a state where a preload is applied to between the plurality of side rollers 313 and 314 and the columnar body.

A plurality of upper rollers 312 are rotatably fixed to between upper parts of the side wall plates 321 and 322. The plurality of upper rollers 312 are arranged parallel with one another along the ejection center axis. Accordingly the plurality of upper rollers 312 have axes of rotation in the lateral direction (the Y direction in the drawings). A support surface that supports the columnar body is defined by lower portions of the plurality of upper rollers 312. A plurality of lower rollers 311 are rotatably fixed to between lower parts of the side wall plates 321 and 322. The plurality of lower rollers 311 are arranged parallel with one another along the ejection center axis. Accordingly, the plurality of lower rollers 311 have axes of rotation in the lateral direction (the Y direction in the drawings). A support surface that supports the columnar body is defined by upper portions of the plurality of lower rollers 311.

A distance from the support surface defined by the plurality of upper rollers 312 to the support surface defined by the plurality of lower rollers 311 corresponds to a thickness of the cylindrical part of the ejection section 30. The support surface defined by the plurality of upper rollers 312 and the support surface defined by the plurality of lower rollers 311 are designed so that the thickness of the cylindrical part of the ejection section 30 is equal to or less than a thickness of the columnar body. Specifically, fixed positions of the plurality of upper rollers 312 and the plurality of lower rollers 311 are determined so that the distance from the support surface defined by the plurality of upper rollers 312 to the support surface defined by the plurality of lower rollers 311 becomes equal to or less than the thickness of the columnar body. When the distance from the support surface defined by the plurality of upper rollers 312 to the support surface defined by the plurality of lower rollers 311 is shorter than the thickness of the columnar body, the plurality of upper rollers 312 and the plurality of lower rollers 311 support the columnar body in a state where a preload is applied to between the plurality of upper rollers 312 and the plurality of lower rollers 311, and the columnar body.

As described above, the width and the thickness of the cylindrical part of the ejection section 30 are designed so as to be smaller than the width and the thickness of the columnar body respectively. This brings about the state where a preload is applied to between the ejection section 30 and the columnar body. An appropriate preload is applied to between the ejection section 30 and the columnar body, and thereby rattling at a time of retraction of the arm is reduced, and as a result of rattling being reduced, strange sound can be prevented. Further, rigidity of the ejection section 30 can be increased. That is, a deformation amount of the ejection section 30 can be decreased with respect to an exerted external force accompanying movement of the arm section 2 and the end effector 3 and an external force corresponding to weights of the arm section 2 and the end effector 3. Thereby, precision with which the position of the arm section 2 is held by the ejection section 30 can be enhanced. In the present embodiment, a fixed position preload is adopted as a method for applying a preload. In the present embodiment, the fixed position preload refers to a method for applying a preload to between the columnar body and the ejection section 30 based on a positional relationship between the rollers and the columnar body. At this time, the space between the rollers is set to be slightly shorter than the width (the thickness) of the columnar body, and thereby a preload is applied to between the columnar body and the ejection section 30. However, the method for applying a preload to between the columnar body and the ejection section 30 is not limited to this method. A preload may be applied to between the columnar body and the ejection section 30 by a constant-pressure preload using a coil spring, a leaf spring, etc. In the present embodiment, a preload can be applied to between the columnar body and the ejection section 30 by pushing the rollers to the columnar body by using these springs.

On the ejection section 30, an external force (the gravity) corresponding to the weights of the arm section 2 and the end effector 3 always work. Accordingly, an effect of a preload being applied to between the ejection section 30 and the columnar body is remarkable especially concerning the upper rollers 312 and the lower rollers 311 of the ejection section 30. On the other hand, a large external force does not work on the side rollers 313 and 314 as compared with the upper rollers 312 and the lower rollers 311. Accordingly, a preload may not be applied to between the side rollers 313 and 314, and the columnar body. That is, the width of the cylindrical part of the ejection section 30 may have any dimension as long as it is equivalent to the width of the columnar body. Further, in place of the side rollers 313 and 314 that are in line contact with the columnar body, ball bearings that are in point contact with the columnar body may be used.

When the drive gear 24a rotates forward, the second connection piece string 20 is guided to the ejection section 30 together with the first connection piece string 21. The first connection piece 23 guided to the ejection section 30 is aligned on a straight line parallel to the ejection center axis while rotating along the last lower roller 311. In the same way, the second connection piece 22 that is guided to the ejection section 30 is aligned on a straight line parallel to the ejection center axis along the axis of rotation of the last upper roller 312. As described above, the thickness of the cylindrical part of the ejection section 30 is slightly shorter than the thickness of the arm section 2. Consequently, the second connection piece string 20 as well as the first connection piece string 21 is sandwiched by the upper roller 312 and the lower roller 311 at a rear part of the ejection section 30. Thereby, the first connection piece string 21 and the second connection piece string 20 are pressed to each other, and joined. The first connection piece string 21 and the second connection piece string 20 which are joined are supported by the plurality of rollers of the ejection section 30, whereby a joined state is kept. When the joined state of the first connection piece string 21 and the second connection piece string 20 is kept, bending of the first connection piece string 21 and the second connection piece string 20 is restricted, and thereby the columnar body having a certain rigidity is formed by the first connection piece string 21 and the second connection piece string 20. Subsequently, the joined arm section 2 is sent out forward from the ejection section 30.

Figure 6A:
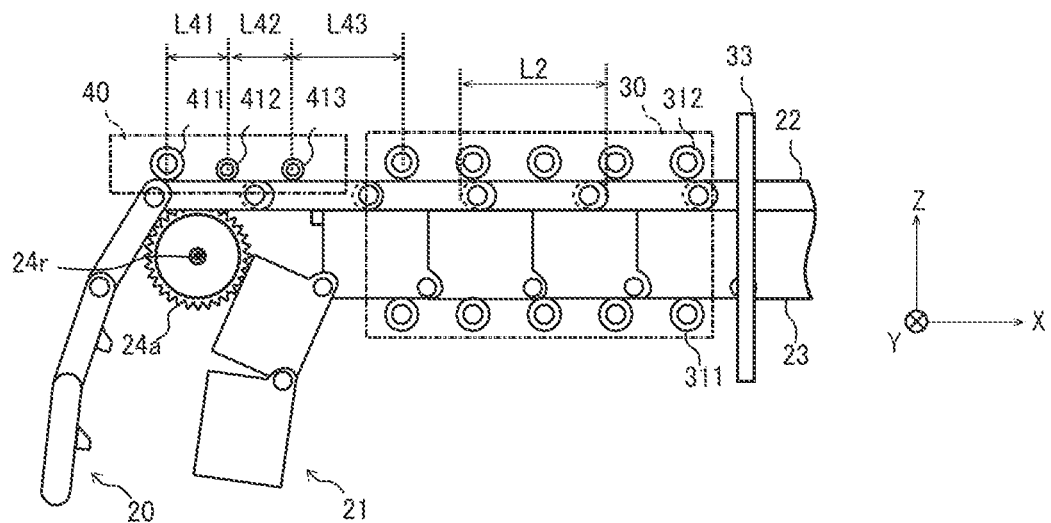
FIGS. 6A and 6B are supplementary explanatory diagrams for explaining a method for disposing a plurality of guide rollers that constitute the guide section of the robot arm mechanism according to the present embodiment.
Figure 6B:
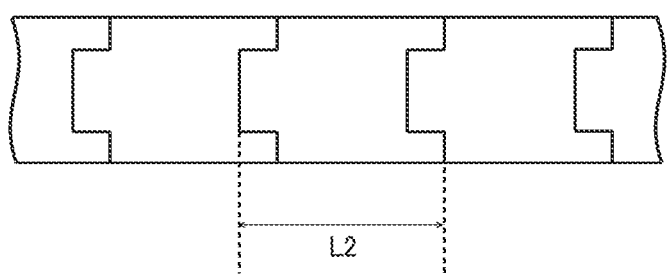

Next, the method for disposing the plurality of guide rollers 411, 412, and 413 is described with reference to FIGS. 6A and 6B. FIGS. 6A and 6B are supplementary explanatory diagrams for explaining the method for disposing the plurality of guide rollers 411, 412, and 413 that constitute the guide section 40 according to the present embodiment. FIG. 6A is a cross section view of a range including the guide section 40 and the ejection section 30 of the robot arm mechanism. FIG. 6B is a supplementary explanatory diagram for explaining a length of the second connection piece 22. As shown in FIG. 6B, in a direction (a lengthwise direction) in which the second connection pieces 22 are connected, a distance L2 from a tip to a rear end of the second connection piece 22 is set as a second connection piece 22 length L2. Further, a distance between axes of rotation of the guide roller 411 and the guide roller 412 (hereinafter, referred to as a roller space L41) is set as L41, and a distance between axes of rotation of the guide roller 412 and the guide roller 413 (hereinafter, referred to as a roller space L42) is set as L42. A distance between the axis of rotation of the guide roller 413 and a rear end of the ejection section 30, herein an axis of rotation of the last upper roller 312 of the ejection section 30, is set as L43 (hereinafter, referred to as a roller space L43).

As shown in FIGS. 6A and 6B, the plurality of guide rollers 411, 412, and 413 are respectively disposed parallel with one another in the region from the vicinity of the drive gear 24a to the ejection section 30. Specifically, the guide roller 413 (the leading guide roller 413) is disposed by being separated from the rear end (from the last upper roller 312) of the ejection section 30 by the roller space L43, with respect to the ejection center axis. The roller space L43 has a length equal to or less than the second connection piece length L2. The leading guide roller 413 is disposed at a same position as the position of the last upper roller 312, with respect to a thickness direction of the ejection section 30.

The guide roller 412 is disposed between the guide rollers 411 and 413. Specifically, the guide roller 412 is disposed at a position separated from the guide roller 411 by the roller space L41, and at a position separated from the guide roller 413 by the roller space L42, with respect to the ejection center axis. The roller spaces L41 and L42 each have a length equal to or less than the second connection piece length L2. Thereby, the second connection piece 22 is supported by at least one of the guide rollers. The guide roller 412 is disposed between the leading guide roller 413 and the last guide roller 411, with respect to the thickness direction of the ejection section 30. When the last guide roller 411 is disposed at the same position as the position of the last upper roller 312 with respect to the thickness direction of the ejection section 30 as in the present embodiment, a surface defined by lower portions of the plurality of guide rollers 411, 412, and 413 and the last upper roller 312 is parallel to the ejection center axis.

When a total length of the roller spaces L41 and L42 is equal to or less than the second connection piece length L2, the guide roller 412 may be omitted. Further, when the total length of the roller spaces L41 and L42 is longer than a length twice as long as the second connection piece length L2, it is preferable to dispose two or more guide rollers between the leading guide roller 413 and the last guide roller 411 so that each of roller spaces is equal to or less than the second connection piece length L2.

Next, a function of the plurality of guide rollers 411, 412, and 413 being disposed in accordance with the conditions described in FIGS. 6A and 6B is described with reference to FIGS. 7A and 7B.

Figure 7A:
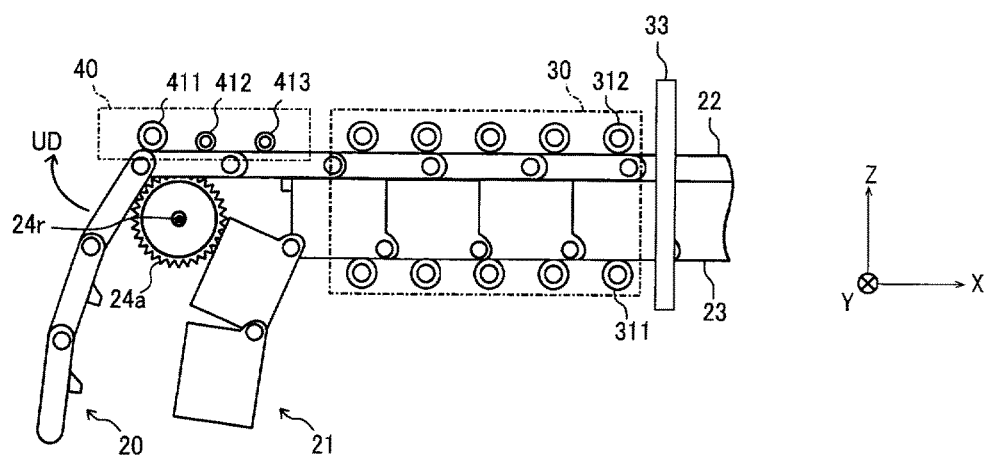
FIGS. 7A and 7B are supplementary explanatory diagrams for explaining a function of the guide section of the robot arm mechanism according to the present embodiment.
Figure 7B:
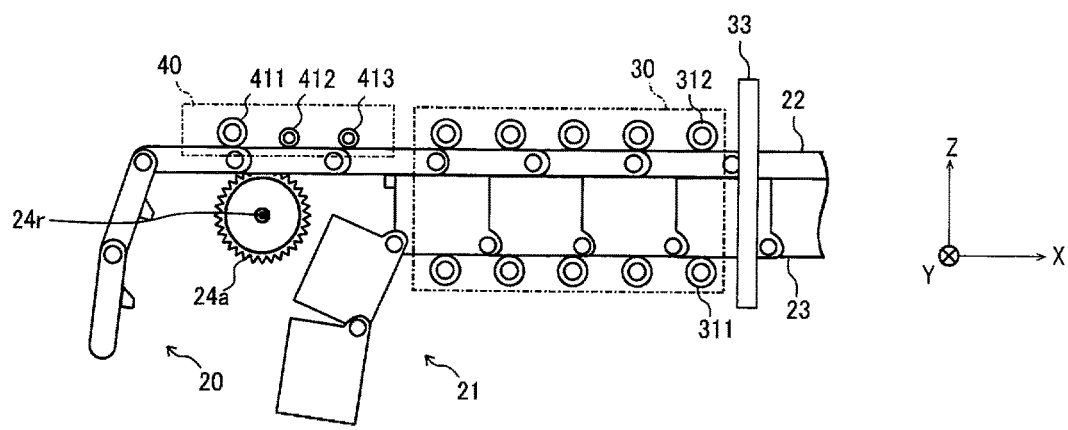

FIGS. 7A and 7B are supplementary explanatory diagrams for explaining the function of the guide section 40 of the robot arm mechanism according to the present embodiment. FIGS. 7A and 7B are cross section diagrams of the range including the guide section 40 and the ejection section 30 of the robot arm mechanism. FIGS. 7A and 7B show a state in which the arm section 2 is sent out. FIG. 7B shows a state after a lapse of a predetermined time from FIG. 7A.

First, a function of the last guide roller 411 is described. When the drive gear 24a is rotated forward, the second connection piece string 20 is guided to the ejection section 30. As shown in FIGS. 6A and 6B, an orientation of the second connection piece 22 changes greatly immediately after the second connection piece 22 engages with the drive gear 24a. Accordingly, especially when the arm section 2 is extended at a high speed, the second connection piece 22 immediately after engaging with the drive gear 24a has its rear part rotated forcibly in a direction of an arrow UD in the drawing around its connection portion of a front part. The last guide roller 411 locks the rotated second connection piece 22 immediately after engaging with the drive gear 24a. Consequently, the last guide roller 411 is disposed at the same position as the position of the drive gear 24a or in the vicinity of the rear part of the drive gear 24a, with respect to the ejection center axis. As a result, the last guide roller 411 can reduce the possibility of the second connection piece 22 colliding against the second support body 11b, the cover thereof, and the like, and can suppress a sound that occurs by a damage or collision of the second connection piece 22.

The last guide roller 411 has a lower hardness than the second connection piece 22. Specifically, the last guide roller 411 has its roller portions covered with an elastic body, for example, a rubber or the like. Thereby, the second connection piece 22 can absorb the force at the time of colliding against the guide roller 411 with the elastic body, so that a damage of the second connection piece 22 can be prevented. Further, for example, the last guide roller 411 has a larger diameter as compared with the other guide rollers. This can increase the possibility of locking the second connection piece 22 which is rotated.

Further, the last guide roller 411 is disposed at the position for sandwiching the second connection piece 22 between the last guide roller 411 and the drive gear 24a, and thereby the last guide roller 411 can keep the engaged state of the linear gear 22a and the drive gear 24a. Accordingly, the last guide roller 411 can prevent the linear gear 22a from disengaging from the drive gear 24a, so that the retraction motion of the arm section 2 can be stabilized.

Next, functions of the plurality of guide rollers 412 and 413 are described. The plurality of guide rollers 412 and 413 are disposed so that the roller space has the length equal to or less than the second connection piece length L2. As a result, at least the one guide roller is disposed in the second connection piece length L2. The second connection piece string 20 has a characteristic that the second connection piece string 20 is bendable in the front surface direction. Accordingly, there is a possibility of the second connection piece string 20 bends in the front surface direction. However, the second connection piece 22 is supported by at least the one guide roller in the front surface direction, so that even when a force that bends in the front surface direction acts on the second connection piece string 20 for some reason, bending in the front surface direction of the second connection piece string 20 can be suppressed. The plurality of guide rollers 412 and 413 have a lower hardness than the second connection piece 22. Consequently, even when a strong force acts on the plurality of guide rollers 412 and 413 by the second connection piece 22, the plurality of guide rollers 412 and 413 are broken earlier than the second connection piece 22, so that damage to the second connection piece 22 can be suppressed.

Furthermore, the leading guide roller 413 has the following function. The leading guide roller 413 is disposed at the same position as that of the last upper roller 312 with respect to the thickness direction of the ejection section 30. The leading guide roller 413 is disposed at the same position as that of the last upper roller 312 with respect to the thickness direction of the ejection section 30, and thereby an angle at which the second connection piece string 20 enters the last upper roller 312 can be made zero. That is, the leading guide roller 413 enables the second connection piece string 20 to enter the ejection section 30 along a direction parallel to the ejection center axis. Accordingly, the orientation of the second connection piece 22 does not change greatly at the last upper roller 312, which reduces a possibility of a problem occurring to joining of the first connection piece 23 and the second connection piece 22 in the ejection section 30.

The structure of the guide section 40 is not limited to the present embodiment.

Figure 8A:
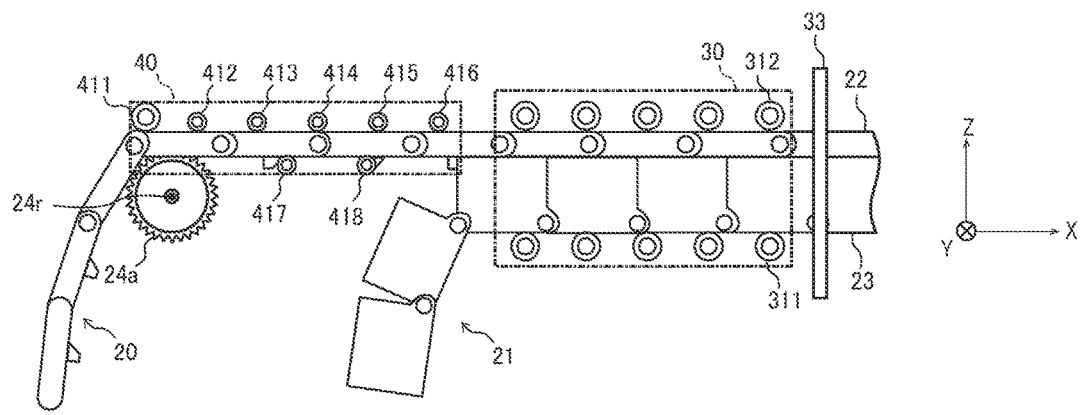
FIGS. 8A to 8C are diagrams illustrating other structure examples of the guide section of the robot arm mechanism according to the present embodiment.
Figure 8B:
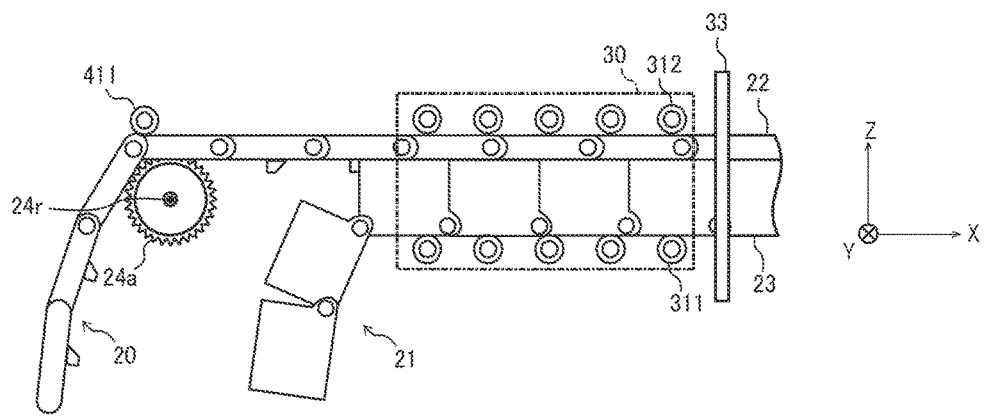
Figure 8C:
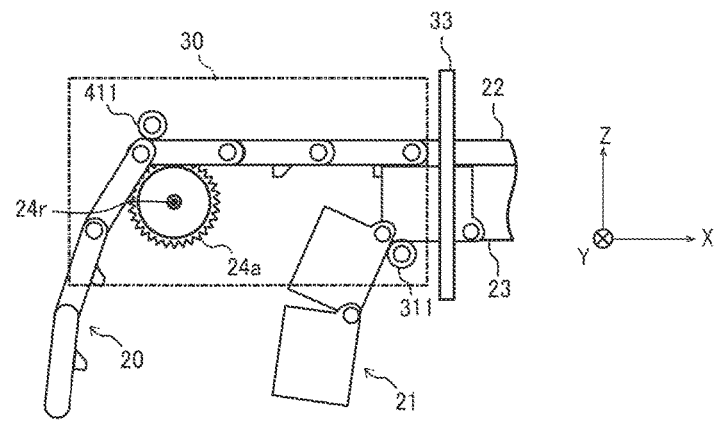

FIGS. 8A to 8C are diagrams illustrating other structure examples of the guide section 40 of the robot arm mechanism according to the present embodiment. As shown in FIG. 8A, when a distance between the drive gear 24a and the ejection section 30 is long, it is preferable to dispose a plurality of guide rollers 412, 413, 414, 415, and 416 along the ejection center axis between the last guide roller 411 and the ejection section 30, so that roller spaces are equal to or less than the second connection piece length L2. Further, when the second connection piece string 20 is also bendable in the back surface direction, a plurality of guide rollers 417 and 418 may be disposed at positions facing the plurality of guide rollers 412, 413, 414, 415, and 416 with the second connection piece string 20 sandwiched between the plurality of guide rollers 412, 413, 414, 415, and 416, and the plurality of guide rollers 417 and 418, as shown in FIG. 8A. At this time, the plurality of guide rollers 417 and 418 are disposed by being separated by a same distance as, or a slightly longer distance than the thickness of the second connection piece 22 from the plurality of guide rollers 412 to 416. Thereby, the plurality of guide rollers 412 to 418 can prevent the second connection piece string 20 from bending in the front surface direction and the back surface direction.

Further, it is assumed that the angle at which the second connection piece string 20 bends in the front surface direction is limited by the pin or the like. In the case like this, as shown in FIG. 8B, the guide section 40 may be constituted of only the guide roller 411. This is because the angle at which the second connection piece string 20 bends in the front surface direction is limited, so that the second connection piece string 20 does not bend greatly in the front surface direction. Accordingly, necessity to prevent bending in the front surface direction of the second connection piece string 20 is low. Further, when the last upper roller 312 and the guide roller 411 are disposed at the same position with respect to the thickness direction of the ejection section 30 as in the present embodiment, the second connection piece 22 that is sandwiched by the guide roller 411 and the drive gear 24a is already parallel to the ejection center axis. Accordingly, it is not necessary to dispose the leading guide roller 413 for allowing the second connection piece string 20 to enter the ejection section 30 along the direction parallel to the ejection center axis. For these reasons, when bending in the back surface direction of the second connection piece string 20 is impossible, and the bending angle in the front surface direction is limited, the plurality of guide rollers 412 and 413 are unnecessary. When the guide roller 411 is separated greatly from the last upper roller 312 with respect to the thickness direction of the ejection section 30, it is necessary to allow the second connection piece string 20 to enter the ejection section 30 along the direction parallel to the ejection center axis as a matter of course. Accordingly, the leading guide roller 413 may be disposed. Since the guide section 40 is constituted in this way, the number of components can be also reduced, so that the effect of cost reduction is provided.

Further, the guide section 40 may function as a part of the ejection section 30. Specifically, as shown in FIG. 8C, the guide roller 411 constitutes the ejection section 30 together with the lower roller 311. At this time, the gravity direction is a −Z direction. At this time, a moment of a force occurs to the columnar body by the gravity that works in accordance with the weights of the arm section 2 and the end effector 3. However, since the columnar body is supported by the guide roller 411, the columnar body that is to rotate by the moment can be suppressed. For example, when the gravity of the arm section 2 and the end effector 3 is light, the ejection section 30 constituted of the guide roller 411 and the lower roller 311 can perform the function of supporting the columnar body. Since the ejection section 30 is constituted in this way, the number of components of the ejection section 30 can be also reduced, so that the effect of cost reduction is provided.

According to the guide section 40 of the robot arm mechanism according to the present embodiment described above, effects as follows are obtained. That is, the guide section 40 can guide the second connection piece 22 immediately after being engaged with the drive gear 24a to the ejection section 30 without colliding the second connection piece 22 against the other mechanisms, when the arm is extended. Specifically, the second connection piece 22 that jumps up immediately after being engaged with the drive gear 24a can be held down by the last guide roller 411. Further, the last guide roller 411 can keep the engaged state of the linear gear 22a that, is provided on the back surface of the second connection piece 22, and the drive gear 24a. That is, the last guide roller 411 can guide the second connection piece string 20 to the ejection section 30 and keep the engaged state of the linear gear 22a provided on the back surface of the second connection piece 22 and the drive gear 24a. Further, the leading guide roller 413 is disposed at the same position as the position of the last upper roller 312 with respect to the ejection center axis. The leading guide roller 413 can allow the second connection piece string 20 to enter the ejection section 30, parallel with the ejection center axis. This can reduce the problem in joining to the first connection piece string 21 in the ejection section 30. Further, the plurality of guide rollers 411, 412, and 413 are arranged so that each of the distances between the axes of rotation is equal to or less than the length of the second connection piece 22. This can prevent the second connection piece string 20 from bending in the front surface direction. Accordingly, the guide section 40 of the robot arm mechanism according to the present embodiment can stabilize the extension and retraction motion of the arm section 2.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A robot arm mechanism comprising a linear extension and retraction joint, wherein:
   the linear extension and retraction joint includes an arm section, and an ejection section for supporting the arm section;
   the arm section includes a first connection piece string and a second connection piece string;
   the first connection piece string includes a plurality of first connection pieces each having a U-shaped cross section, an arc cross section, or a hollow square cross section, and the second connection piece string includes a plurality of second connection pieces each having a substantially flat plate shape
   the second connection piece string is joined to the first connection piece string to thereby constitute a columnar body;
   the second connection piece string is sent out forward from the ejection section together with the first connection piece string in a state where the second connection piece string is joined to the first connection piece string;
   a guide roller for guiding the second connection piece string to the ejection section and keeping an engaged state of a linear gear provided on the second connection piece and a drive gear for driving the second connection piece string is provided;
   the linear gear is formed on each of the second connection pieces;
   the drive gear is engaged with the linear gear, so as to drive the second connection piece string forward and backward;
   a plurality of guide rollers are arranged in line on a surface of the second connection piece string, such that the second connection piece string is sandwiched between the guide rollers and the drive gear;
   one of the guide rollers positioned at a tail end of the line in a direction of the second connection piece string sent out is disposed for keeping engagement of the drive gear and the linear gear; and
   at least with respect to two adjacent guide rollers of the plurality of the guide rollers, a distance between the adjacent guide rollers is less than length of the second connection piece in the direction of the second connection piece string sent out, for preventing the second connection piece string from bending.

2. The robot arm mechanism according to claim 1, wherein
   the guide roller is provided at a same position as a position of the drive gear, or rearward of the drive gear, with respect to a center axis of the arm section.

3. The robot arm mechanism according to claim 1, wherein a front surface of the guide roller has a lower hardness than the second connection piece.

* * * * *